United States Patent  
Fratti et al.

(10) Patent No.: US 8,245,067 B2  
(45) Date of Patent: Aug. 14, 2012

(54) POWER SHARING AMONG PORTABLE ELECTRONIC DEVICES

(75) Inventors: Roger A. Fratti, Mohnton, PA (US); Cathy Lynn Hollien, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 619 days.

(21) Appl. No.: 12/158,209

(22) PCT Filed: Nov. 30, 2007

(86) PCT No.: PCT/US2007/086062  
§ 371 (c)(1), (2), (4) Date: Jun. 19, 2008

(87) PCT Pub. No.: WO2009/070171  
PCT Pub. Date: Jun. 4, 2009

(65) Prior Publication Data  
US 2010/0223480 A1 Sep. 2, 2010

(51) Int. Cl.  
*G06F 1/28* (2006.01)
(52) U.S. Cl. ........................ 713/340; 713/330
(58) Field of Classification Search .................. 713/330, 713/340  
See application file for complete search history.

(56) References Cited

U.S. PATENT DOCUMENTS

| 5,998,968 | A | * | 12/1999 | Pittman et al. | 320/130 |
| 7,809,960 | B2 | * | 10/2010 | Cicchetti et al. | 713/300 |
| 2002/0145338 | A1 | | 10/2002 | Stevens | |
| 2005/0033997 | A1 | | 2/2005 | Boynton et al. | |
| 2005/0246557 | A1 | | 11/2005 | Vanzante | |
| 2007/0083668 | A1 | | 4/2007 | Kelsey et al. | |
| 2008/0250255 | A1 | * | 10/2008 | Diab | 713/300 |

FOREIGN PATENT DOCUMENTS  
WO WO2006126160 11/2006  
WO PCTUS2007086062 7/2008  
* cited by examiner

*Primary Examiner* — Thuan Du  
(74) *Attorney, Agent, or Firm* — Ryan, Mason & Lewis, LLP

(57) ABSTRACT

A portable electronic device is operative to facilitate power sharing with at least a second electronic device coupled thereto. The portable electronic device includes a battery power source, a first port adapted for connection to a first network connection and a second port adapted for connection to a second network connection. An input stage in the portable electronic device is connected to the first port. The input stage is operative to supply power received from the first network connection through the first port to the battery power source for recharging the battery power source. The portable electronic device further includes an output stage connected to the second port. The output stage is operative to supply power from the battery power source to the second network connection through the second port.

24 Claims, 2 Drawing Sheets

POWER SHARING AMONG PORTABLE ELECTRONIC DEVICES

FIELD OF THE INVENTION

The present invention relates generally to electronic devices, and more particularly to power sharing among electronic devices.

BACKGROUND OF THE INVENTION

With advancements in computer systems and broadband internet connections, computer networks (e.g., local area networks (LANs)) have become prolific and are commonly found in both commercial and residential environments. Moreover, advances in wireless technology have enabled users to access the internet from portable electronic devices via wireless LANs (WLANs), including wireless fidelity (WiFi) employing an Institute of Electrical and Electronics Engineers (IEEE) 802.11 wireless networking protocol, Bluetooth® (a registered trademark of Bluetooth SIG, Inc.), infrared, or other wireless technology, and thereby untether themselves from the confines of a traditional office environment. Such portable devices providing wireless access may include, for example, laptop computers, cell phones, Blackberry® handheld devices (a registered trademark of Research in Motion Limited), etc.

While portable electronic devices may address mobile computing needs, they are not without limitations. For instance, a portable device, when unplugged from a conventional power outlet, can only operate for a limited amount of time using its internal battery power source, after which the battery must be recharged via the power outlet. It is known to extract power from a network port, as in a Power-over-Ethernet (PoE) application employing an IEEE 802.3af standard (see, e.g., U.S. Patent Application Publication No. 2005/0246557 A1, the disclosure of which is incorporated by reference herein). As an application of this technology, PoE is often used for supplying power to access points (APs) in a WLAN, since the APs are sometimes placed in areas in which a power outlet is not available. However, while it is known to power an individual electronic device from a direct Ethernet connection, there are currently no known mechanisms for charging the internal batteries of multiple electronic devices from a single direct connection to a power outlet.

Accordingly, there exists a need for techniques for sharing power among portable electronic devices which do not suffer from one or more of the above-noted problems exhibited by conventional approaches.

SUMMARY OF THE INVENTION

Illustrative embodiments of the present invention meet the above-noted need by providing techniques for charging the internal batteries of portable electronic devices connected together serially, such as in a daisy chain configuration. Techniques of the invention beneficially eliminate the need for a separate direct connection to a mains power outlet for each device. This is particularly advantageous, for example, when traveling to a foreign country, which often requires the use of power converters and/or adapters, or when working in an environment in which there are many portable electronic devices vying for a limited number of power outlets.

In accordance with one aspect of the invention, a portable electronic device is operative to facilitate power sharing with at least a second electronic device coupled thereto. The portable electronic device includes a battery power source, a first port adapted for connection to a first network connection and a second port adapted for connection to a second network connection. An input stage in the portable electronic device is connected to the first port. The input stage is operative to supply power received from the first network connection through the first port to the battery power source for recharging the battery power source. The portable electronic device further includes an output stage connected to the second port. The output stage is operative to supply power from the battery power source to the second network connection through the second port.

In accordance with another aspect of the invention, a method of sharing power between portable electronic devices is provided, wherein each device contains a battery power source. The method includes the steps of: receiving power through a first port of a given one of the portable electronic devices; charging the battery power source in the given portable electronic device using the power received from the first port; and directing power from the battery power source in the given portable electronic device to a second port in the device, the second port being adapted for connection to another of the portable electronic devices.

In accordance with yet another aspect of the invention, a power sharing system includes a first portable electronic device including a first battery power source, and at least a second portable electronic device including a second battery power source. The second portable electronic device is coupled to the first portable electronic device via a network connection. The second portable electronic device is adapted to receive power for recharging the second battery power source from the first battery power source via the network connection.

These and other features, aspects and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative architectures for sharing power among portable electronic devices. While reference may be made to specific illustrative circuit arrangements used in describing certain aspects of the invention, it is to be appreciated that the invention is not limited to these specific arrangements, and that one skilled in the art given the teachings herein may propose modifications thereto that are within the scope of the present invention.

Figure 1:
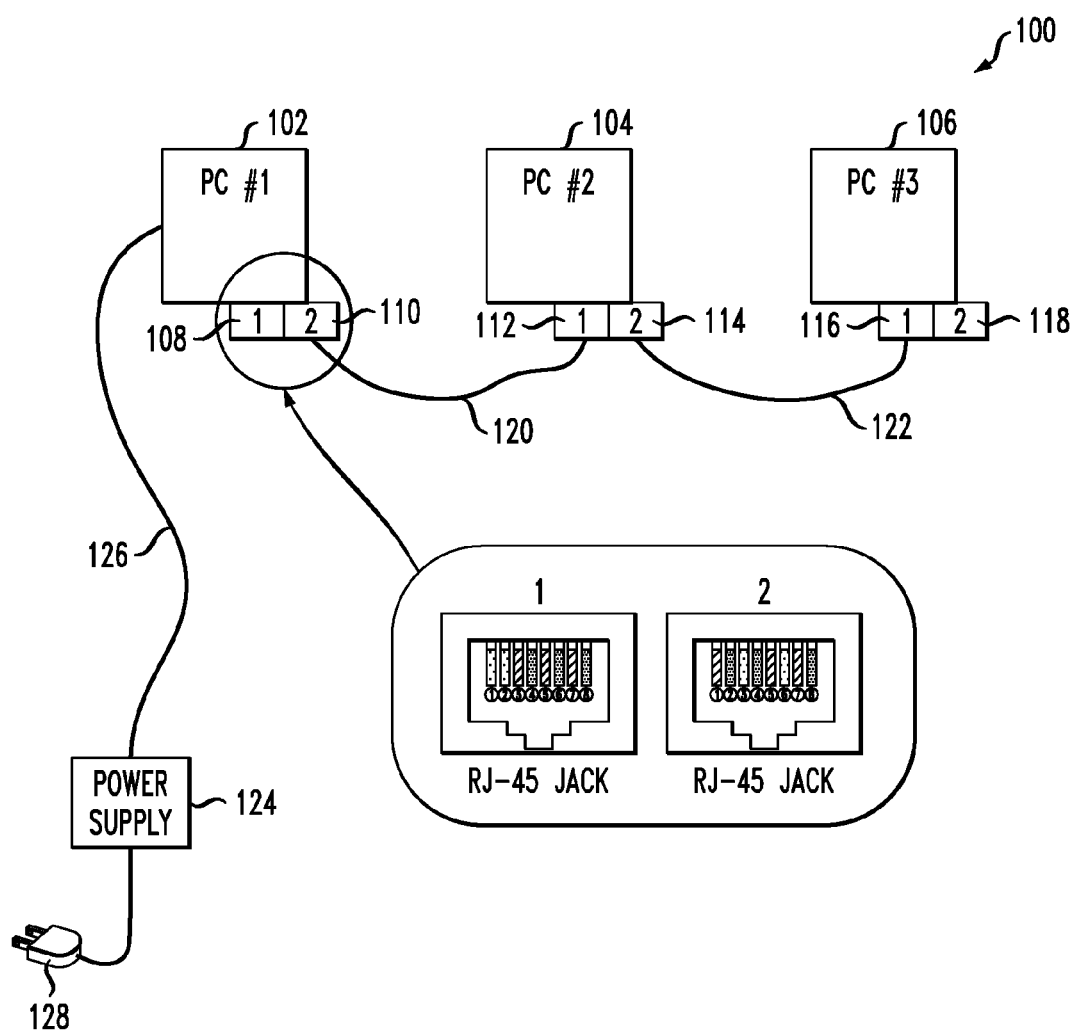
FIG. 1 is a block diagram depicting an illustrative system for sharing power among multiple portable electronic devices, in accordance with one aspect of the present invention.

FIG. 1 is a block diagram depicting an illustrative system 100 for sharing power among multiple portable electronic devices, in accordance with one aspect of the invention. System 100 includes a plurality of portable electronic devices 102, 104 and 106, each of which may be a portable personal computer (PC) including, for example, a laptop computer, handheld computing device (e.g., Blackberry®, personal digital assistant), or the like. A portable electronic device suitable for use with the present invention may also include, for example, a cell phone, MP3 player, etc. All of the portable electronic devices 102, 104, 106 connected in system 100 need not be of the same type and/or functionality. Each portable electronic device preferably includes a first port (1), which may be an input power port, and a second port (2), which may be an output power port. Specifically, device 102 includes a first port 108 and a second port 110, device 104 includes a first port 112 and a second port 114, and device 106 includes a first port 116 and a second port 118.

The term "port" as used herein is intended to broadly refer to a connection mechanism for passing signals into or out of a device and/or between two or more devices. A port is generally a place for being physically connected to some other device, usually in a removable configuration (e.g., socket and plug) of some kind. Two common types of physical ports are device ports and network ports. Device ports are often used to facilitate the connection of two or more devices (e.g., via a cable or directly) and may include such standard protocols as Universal Serial Bus (USB), FireWire, etc. Network ports are often used to facilitate the connection of a device to a network, such as, but not limited to, Ethernet. The term "port" is intended to be broadly construed so as to encompass, for example, sockets, jacks (e.g., headphone jack or telephone jack), interfaces (e.g., network interface), etc.

One or more of ports 108, 110, 112, 114, 116 and 118 may comprise a network port, such as, for example, an Ethernet (e.g., PoE) connection, although the invention is not limited to any particular protocol. The devices may be interconnected to one another using standard network cabling, such as, for example, Category-5 (CATS) or alternative cabling. More particularly, an output power port 110 of device 102 may be connected to the input power port 112 of device 104 via cable 120. Likewise, output power port 114 of device 104 may be connected to input power port 116 of device 106 via cable 122. The first and second ports of devices 102, 104 and 106 are shown as comprising an eight position eight contact (8P8C) modular Ethernet-type connector, as typically employed with a register jack (RJ)-45 or other standard, although alternative connector types, either standard or non-standard, are similarly contemplated.

As apparent from the figure, the first device 102 in the chain may not utilize the input power port 108. Rather, power may be received by the first device 102 directly from an external power supply 124 via a cable 126. Cable 126 may be connected to a corresponding power connector of device 102, such as, for example, a 2-pin direct current (DC) power jack. Power supply 124 typically receives alternating current (AC) power directly from a power outlet via a standard plug 128. Power supply 124 may comprise, for example, a step-down transformer (not explicitly shown) for reducing the AC voltage received from the power outlet (e.g., 120 volts) to a level suitable for use with the battery power source in device 102. Furthermore, power supply 124 may comprise rectification circuitry (not explicitly shown), which may include one or more diodes, for converting the received AC voltage to a DC voltage, as will be known by those skilled in the art.

While only three portable electronic devices 102, 104, 106 are shown, it is to be understood that the invention is not limited to any particular number of portable devices that may be connected in the chain of devices. Rather, illustrative system 100 may include fewer portable electronic devices (e.g., 2) or more portable electronic devices (e.g., 4). For example, an additional device may be included by connecting a cable between the output power port 118 of the last device 106 in the chain and an input power port of the added device, as will become apparent to those skilled in the art given the teachings herein. Moreover, when power sharing system 100 includes only two portable electronic devices (e.g., 102 and 104) and no further expansion is required, the input power port 108 of the first device 102 is not used and may therefore be eliminated. Likewise, the output power port 114 of the second device 104 is not used and may therefore be eliminated.

Figure 2:
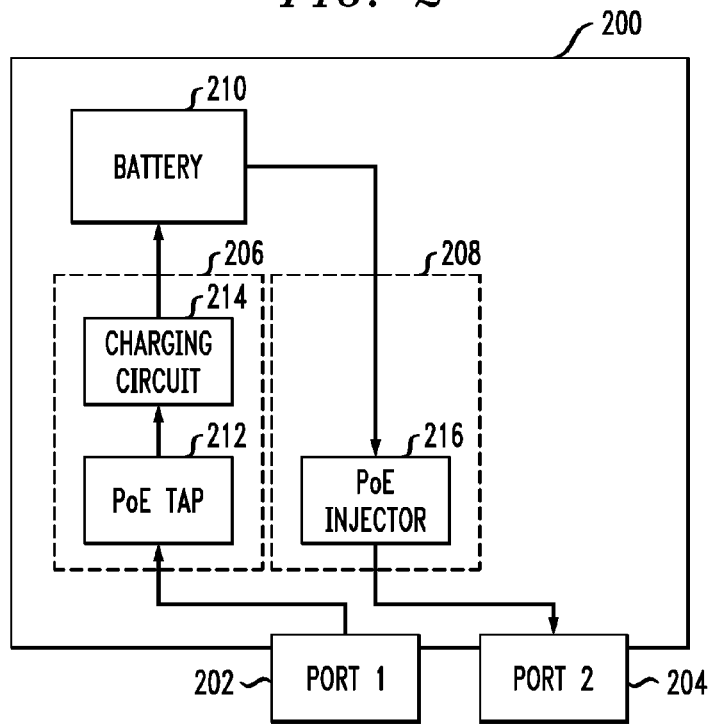
FIG. 2 is a block diagram depicting at least a portion of an exemplary portable electronic device, in accordance with an embodiment of the present invention.

With reference now to FIG. 2, at least a portion of an exemplary portable electronic device 200 is shown, in accordance with an embodiment of the invention. Device 200, which may be an implementation of one of the portable electronic devices 102, 104 or 106, in the illustrative system 100 shown in FIG. 1, includes a first port 202 for receiving power and a second port 204 for supplying power to a downstream portable electronic device connected to the second port. Each of first and second ports 202 and 204, respectively, may comprise a network port, such as, for example, an Ethernet (e.g., PoE) connection, although the invention is not limited to any particular type of port. In the case of a PoE connection, ports 202 and 204 may include, for example, RJ45-compatible jacks, although the invention is not limited to any particular type of connection.

Input power port 202 is connected to an input stage 206. Similarly, output power port 204 is connected to an output stage 208. Input stage 206 is preferably operative to receive power from the input power port 202 and to deliver at least a portion of the received power to a battery power source 210 within the portable electronic device 200 for charging the battery power source. Although not explicitly shown for clarity purposes, at least a portion of the power received from input power port 202 may also be supplied to other circuitry in the device 200. Output stage 208 is operative to receive power from the battery power source 210 and to deliver at least a portion of the power received from the battery power source to the output power port 204 for supplying power to a downstream device connected to the output power port.

Some portable electronic devices are adapted to accept injected DC power directly from a CATS cable, or alternative connection means (e.g., coaxial cable, twisted pair wiring, etc.) through their respective input power ports (e.g., RJ45 jack). These devices are considered to be "PoE compatible" or "active Ethernet compatible." Devices that are not PoE compatible can be converted to be PoE-compliant by way of a DC PoE tap 212, sometimes referred to as a "picker" or "splitter," included in the input stage 206. The PoE tap 212 is connected to input power port 202 and is operative to extract the DC voltage that has been injected into the input power port. Two basic types of taps are passive and regulated. A passive PoE tap simply takes the voltage received from the input power port 202 and supplies this voltage for direct connection in the device. A regulated PoE tap takes the voltage received from the input power port 202 and converts this voltage to another voltage which is substantially constant regardless of varying levels of the received voltage. In accordance with another aspect of the invention, PoE tap 212 may comprise control circuitry (e.g., current limiting circuit, voltage clamp, etc.) for selectively controlling the amount of power drawn from the input power port 202.

Input stage 206 further includes a charging circuit 214 connected to the PoE tap 212 and to the battery power source 210. The charging circuit 214 is operative to receive the voltage supplied by the PoE tap 212 and to supply at least a portion of this voltage to battery power source 210 for charging the battery power source. Charging circuit 214 is preferably configured to supply a charging voltage and/or current to the battery power source 210 which is substantially matched to a prescribed charging profile of the battery power source, or to an alternative specification. The voltage and/or current level supplied to the battery power source 210 may be a function of one or more characteristics of the battery power source, including but not limited to maximum output voltage, maximum output current, internal cell impedance, cell type (e.g., wet or dry), chemical composition (e.g., lithium-ion, nickel-cadmium, nickel metal hydride, alkaline, lead-acid), etc. In an illustrative embodiment of the invention, charging circuit 214 may comprise a voltage and/or current regulator circuit.

Charging methodologies performed by charging circuit 214 may be separated into two general categories: fast charge and slow charge. A slow charge is usually defined as a charging current that can be applied to the battery power source indefinitely without damaging the cell. This method is sometimes referred to as "trickle charging." An advantage of this charging methodology is that it generally requires no end-of-charge detection circuitry, since it cannot damage the battery power source regardless of how long it is used. A disadvantage of this methodology is that it takes a considerable amount of time to recharge the battery power source. A fast charge is usually defined as a recharge time of about one hour, which corresponds to a charge rate of about 1.2c, where c is a function of the Ampere-hour rating of the cell. Using a fast charging methodology, a cell temperature within the range from about 10 degrees Celsius to about 40 degrees Celsius is generally maintained for safety reasons, so as to prevent gas from building up within which can eventually cause the cell to explode. An advantage of this methodology is that a battery power source can be recharged in a short period of time. A disadvantage is that end-of-charge detection circuitry (which typically involves monitoring the voltage and/or temperature of the battery power source) is required to prevent overcharging of the battery power source, which increases the complexity and cost of the charging circuit 214.

Output stage 208 preferably comprises a PoE injector 216, or alternative voltage injection circuitry, connected between the battery power source 210 and the output power port 204. PoE injector 216 is preferably operative to receive a DC voltage from the battery power source 210 and to insert at least a portion of this voltage into the output power port 204. Two basic types of injectors are passive and active. Active PoE injectors utilize active components and are able to transfer power up to about 100 meters along standard Ethernet (e.g., CAT5) cabling. Passive PoE injectors utilize free wires in the Ethernet cable and are able to transfer power along them to the far end up to about 30 to 40 meters. Optionally, PoE injector 216 comprises automatic load sensing circuitry, with current limitation and/or over voltage protection, thereby eliminating the risk of damaging cabling or portable electronic devices connected to the output power port 204. It is to be appreciated that protocols and cabling types other than PoE may be employed for conveying the voltage from battery power source 210 to a downstream portable electronic device connected to the output power port 204.

Figure 3:
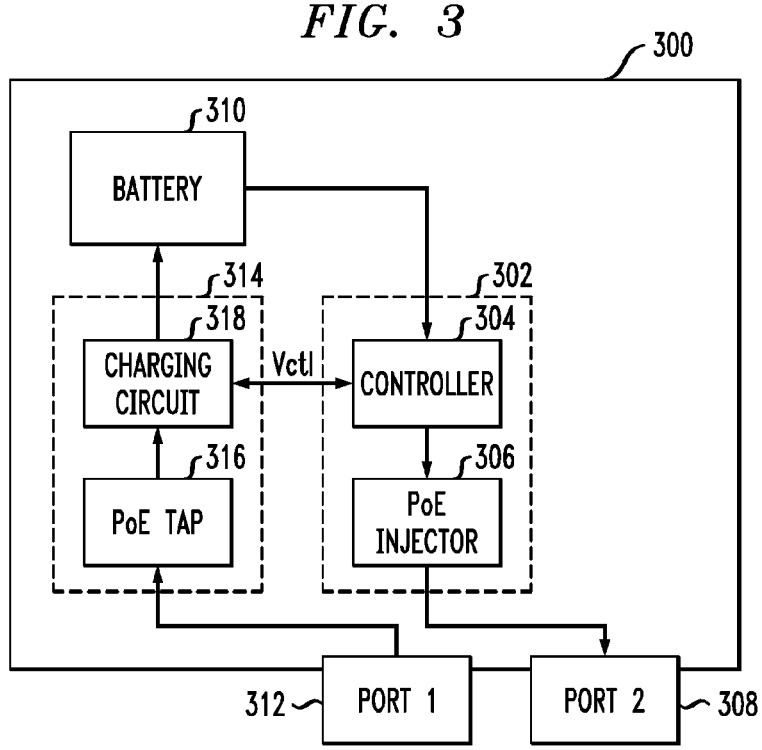
FIG. 3 is a block diagram depicting at least a portion of an exemplary portable electronic device, in accordance with another embodiment of the present invention.

Referring now to FIG. 3, in accordance with another aspect of the invention, an output stage 302 in an exemplary portable electronic device 300 comprises a controller 304, or alternative processor, connected to a PoE injector 306. The PoE injector 306 is connected to an output power port 308 for supplying power to a downstream portable electronic device connected to the output power port. A battery power source 310 in device 300 is connected to controller 304. Device 300 further includes an input power port 312 which is connected to an input stage 314 in the device. In the case of a PoE connection, ports 308 and 312 may include, for example, RJ45-compatible jacks, although the invention is not limited to any particular type of connection.

Input stage 314, like input stage 206 in device 200 shown in FIG. 2, comprises a PoE tap 316, connected to input power port 312, and a charging circuit 318 connected to the PoE tap and to battery power source 310. The PoE tap 316 is operative to extract a DC voltage that has been injected into the input power port 312. The charging circuit 318 is operative to receive the voltage supplied by the PoE tap 316 and to supply at least a portion of this voltage to battery power source 310 for charging the battery power source. Charging circuit 318 is preferably configured to supply a charging voltage and/or current to the battery power source 310 which is substantially matched to a prescribed charging profile of the battery power source, or to an alternative specification.

As apparent from the figure, output stage 302 in device 300 may be similar to output stage 208 in device 200 shown in FIG. 2, with the exception of the addition of controller 304 connected between the battery power source 310 and the PoE injector 306. Controller 304 is preferably operative to selectively control a level of voltage and/or current supplied to the PoE injector 306. Ideally, the amount of voltage and/or current delivered to a downstream device through the output power port 308 will be less than the amount of voltage and/or current supplied to battery power source 310 by charging circuit 318, otherwise the battery power source will be depleted faster than it is recharged. There may be situations, however, in which it is at least temporarily acceptable for the amount of power removed from battery power source 310 to be greater than the amount of power supplied to the battery power source during charging.

Controller 304 may include at least one input adapted for receiving a control signal, Vctl, for controlling a level of voltage and/or current supplied to output power port 308. The control signal may be generated, for example, by input stage 314, such as by charging circuit 318, and may be indicative of a level of voltage and/or current being supplied to battery power source 310 at a given time. Alternatively, or in addition to control signal Vctl, controller 304 may be operative to monitor a level of voltage and/or current supplied by battery power source 310 to determine a capability of the battery power source to supply a prescribed level of voltage and/or current to output power port 308. Controller 304 may be operative to monitor a power demand of a second device connected to the output power port 308 and to control a level of power supplied to the second port as a function of the power demand of the second device. In an illustrative embodiment of the invention, controller 304 may comprise a voltage and/or current regulator circuit for supplying a substantially constant voltage and/or current, respectively, to a device connected to the output power port 308.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with the present invention can be employed in any application and/or electronic system which is capable of operating from a battery power source. Suitable systems for implementing techniques of the invention may include, but are not limited to, portable computing devices, communication networks, electronic instruments, etc. Systems incorporating such integrated circuits are considered part of this invention. Given the teachings of the invention provided herein, one of ordinary skill in the art will be able to contemplate other implementations and applications of embodiments of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A first user interface device operative to facilitate power sharing with at least a second user interface device coupled thereto, the first and second user interface devices each comprising:
a battery power source;
an input power port and an output power port adapted for connection to respective network connections;
an input stage connected to the input power port, the input stage being operative to supply power received through the input power port to the battery power source for recharging the battery power source; and
an output stage connected to the output power port, the output stage being operative to supply power from the battery power source through the output power port;
wherein the output power port of the first user interface device is adapted to supply power to the input power port of the second user interface device.

2. The first user interface device of claim 1, wherein the input stage comprises a charging circuit operative to receive the power from the input power port and to control an amount of the power supplied to the battery power source.

3. The first user interface device of claim 2, wherein the charging circuit comprises at least one of a voltage regulator and a current regulator for supplying at least one of a substantially constant voltage and current, respectively, to the battery power source.

4. The first user interface device of claim 2, wherein the amount of the power supplied to the battery power source is selectively controlled by the charging circuit as a function of at least one characteristic of the battery power source.

5. The first user interface device of claim 4, wherein the at least one characteristic of the battery power source comprises at least one of a prescribed charging profile, maximum output voltage, maximum output current, internal cell impedance, cell type and chemical composition of the battery power source.

6. The first user interface device of claim 2, wherein the amount of the power supplied to the battery power source corresponds to a charge rate greater than an Ampere-hour rating of the battery power source.

7. The first user interface device of claim 2, wherein the charging circuit comprises end-of-charge detection circuitry operative to prevent overcharging of the battery power source.

8. The first user interface device of claim 7, wherein the end-of-charge detection circuitry is operative to monitor at least one of a voltage of the battery power source and a temperature of the battery power source.

9. The first user interface device of claim 2, wherein the charging circuit is operative to maintain a temperature of the battery power source within a range from about 10 degrees Celsius to about 40 degrees Celsius.

10. The first user interface device of claim 1, wherein the input stage comprises a Power-over-Ethernet tap connected to the input power port and operative to extract a DC voltage from the first network connection and to supply at least a portion of the DC voltage to the battery power source.

11. The first user interface device of claim 10, wherein the Power-over-Ethernet tap connected to the input power port comprises a regulated Power-over-Ethernet tap operative to extract a variable DC voltage from the first network connection, convert the variable DC voltage extracted from the first network connection to a substantially constant DC voltage, and to supply the substantially constant DC voltage to the battery power source.

12. The first user interface device of claim 1, wherein the output stage comprises a Power-over-Ethernet injector connected to the output power port and operative to receive a DC voltage from the battery power source and to insert at least a portion of the DC voltage into the second network connection.

13. The first user interface device of claim 1, wherein the output stage comprises a controller operative to selectively control a level of the power from the battery power source supplied to the output power port.

14. The first user interface device of claim 13, wherein the controller is operative to monitor a level of the power supplied to the battery power source, the level of the power supplied to the output power port being controlled as a function of the level of the power supplied to the battery power source.

15. The first user interface device of claim 13, wherein the controller comprises at least one of a voltage regulator and a current regulator for supplying at least one of a substantially constant voltage and current, respectively, to the output power port.

16. The first user interface device of claim 13, wherein the controller is operative to monitor a power demand of the third user interface device connected to the output power port and to control the level of power supplied to the output power port as a function of the power demand of the third user interface device.

17. The first user interface device of claim 1, wherein the first user interface device comprises at least one of a personal computer, a handheld computing device, a personal digital assistant, a cell phone, and a digital music player.

18. The first user interface device of claim 1, wherein the battery power source is recharged from a direct connection to a power outlet and wherein the battery power source supplies power from the output power port of the first user interface device to the input power port of the second user interface device for recharging the battery power source of the second user interface device.

19. The first user interface device of claim 18, wherein the input power port is not utilized for recharging the battery power source of the first user interface device.

20. A method of sharing power between at least first and second user interface devices, wherein each user interface device comprises a battery power source, and wherein each user interface device further comprises an input power port and an output power port adapted for connection to respective network connections, the method comprising the steps of:
receiving power through the input power port of the first user interface device;
charging the battery power source in the first user interface device using the power received from the input power port of the first user interface device;
directing power from the battery power source in the first user interface device to the output power port of the first user interface device; and supplying power from the output power port of the first user interface device to the input power port of the second user interface device.

21. The method of claim 20, wherein the step of directing power further comprises the step of controlling an amount of power directed from the battery power source to the output power port as a function of at least one of an amount of power received through the input power port and an amount of power directed to the output power port.

22. The method of claim 21, wherein the step of controlling the amount of power directed from the battery power source to the output power port comprises detecting at least one of the amount of power received through the input power port, an amount of power directed to the output power port, and an amount of power in the battery power source.

23. A power sharing system comprising:
a first user interface device coupled to a second user interface device;
wherein each of the first user interface device and the second user interface device comprises:
a battery power source;
an input power port and an output power port adapted for connection to respective network connections;
an input stage connected to the input power port, the input stage being operative to supply power received through the input power port to the battery power source for recharging the battery power source; and
an output stage connected to the output power port, the output stage being operative to supply power from the battery power source through the output power port;
wherein the output power port of the first user interface device is adapted to supply power to the input power port of the second user interface device.

24. The power sharing system of claim 23, further comprising a third user interface device coupled to the second user interface device;
wherein the third user interface device comprises:
a battery power source;
an input power port and an output power port adapted for connection to respective network connections;
an input stage connected to the input power port, the input stage being operative to supply power received through the input power port to the battery power source for recharging the battery power source; and
an output stage connected to the output power port, the output stage being operative to supply power from the battery power source through the output power port; and
wherein the output power port of the second user interface device is adapted to supply power to the input power port of the third user interface device.

\* \* \* \* \*